United States Patent
Fujii et al.

(10) Patent No.: US 9,548,165 B2
(45) Date of Patent: Jan. 17, 2017

(54) PREDOPING METHOD FOR LITHIUM, LITHIUM-PREDOPED ELECTRODE, AND ELECTRICITY STORAGE DEVICE

(71) Applicant: SHIN-ETSU CHEMICAL CO., LTD., Chiyoda-ku, Tokyo (JP)

(72) Inventors: Masanori Fujii, Kyoto (JP); Hisashi Satake, Kyoto (JP); Hajime Kinoshita, Kyoto (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 62 days.

(21) Appl. No.: 14/399,594

(22) PCT Filed: May 8, 2013

(86) PCT No.: PCT/JP2013/062895
§ 371 (c)(1),
(2) Date: Nov. 7, 2014

(87) PCT Pub. No.: WO2013/168727
PCT Pub. Date: Nov. 14, 2013

(65) Prior Publication Data
US 2015/0115206 A1    Apr. 30, 2015

(30) Foreign Application Priority Data
May 9, 2012    (JP) .................. 2012-107907

(51) Int. Cl.
*H01M 4/88*    (2006.01)
*H01G 9/042*    (2006.01)
(Continued)

(52) U.S. Cl.
CPC ............. *H01G 9/042* (2013.01); *H01G 9/15* (2013.01); *H01G 11/50* (2013.01); *H01G 11/86* (2013.01);
(Continued)

(58) Field of Classification Search
CPC ........................... H01M 4/131; H01M 4/134
(Continued)

(56) References Cited

U.S. PATENT DOCUMENTS 6,461,769 B1    10/2002    Ando et al.
6,740,454 B1    5/2004    Ando et al.
(Continued)

FOREIGN PATENT DOCUMENTS

JP    59-3806 A    1/1984
JP    3-233860 A    10/1991
(Continued)

OTHER PUBLICATIONS

English translation of International Search Report issued Jul. 30, 2013, in PCT International Application No. PCT/JP2013/062895.
(Continued)

*Primary Examiner* — Khanh Tuan Nguyen
(74) *Attorney, Agent, or Firm* — Birch, Stewart, Kolasch & Birch, LLP

(57) ABSTRACT

A predoping method for lithium, which is characterized by mixing and kneading, in the presence of a solvent, lithium metal with (a) silicon and a composite dispersion of silicon and silicon dioxide, (b) particles represented by SiOx (wherein 0.5≤x<1.6) and having a fine structure wherein fine silicon particles are dispersed in a silicon-based compound, and (c) an Si-based material that is a mixture of one or more oxides selected from among the lower oxides of silicon represented by the above-mentioned formula and that is capable of absorbing and desorbing lithium ions; a lithium-predoped electrode which uses the predoping method for lithium; and an electricity storage device.

13 Claims, 2 Drawing Sheets

(51) Int. Cl.
| | |
|---|---|
| *H01M 4/134* | (2010.01) |
| *H01M 4/36* | (2006.01) |
| *H01M 4/38* | (2006.01) |
| *H01M 4/48* | (2010.01) |
| *H01G 11/50* | (2013.01) |
| *H01G 11/86* | (2013.01) |
| *H01G 9/15* | (2006.01) |
| *H01M 4/131* | (2010.01) |
| *H01M 4/62* | (2006.01) |

(52) U.S. Cl.
CPC ............ *H01M 4/131* (2013.01); *H01M 4/134* (2013.01); *H01M 4/364* (2013.01); *H01M 4/386* (2013.01); *H01M 4/48* (2013.01); *H01M 4/483* (2013.01); *H01M 4/622* (2013.01); *H01M 4/625* (2013.01); *Y02E 60/122* (2013.01); *Y02E 60/13* (2013.01)

(58) Field of Classification Search
USPC .................. 252/182.1, 500; 429/231.8, 300
See application file for complete search history.

(56) References Cited

U.S. PATENT DOCUMENTS

| | | | |
|---|---|---|---|
| 6,862,168 B2 | 3/2005 | Ando et al. | |
| 7,385,801 B2 | 6/2008 | Ando et al. | |
| 8,753,774 B2 | 6/2014 | Kawada | |
| 2007/0224508 A1 | 9/2007 | Aramata et al. | |
| 2009/0202911 A1 | 8/2009 | Fukuoka et al. | |
| 2010/0009261 A1 | 1/2010 | Watanabe | |
| 2011/0244328 A1 | 10/2011 | Iriyama et al. | |
| 2011/0244333 A1* | 10/2011 | Kawada | H01M 4/131 429/231.8 |
| 2012/0321962 A1* | 12/2012 | Kajita | H01M 4/134 429/300 |

FOREIGN PATENT DOCUMENTS

| | | | |
|---|---|---|---|
| JP | 5-234621 A | 9/1993 | |
| JP | 10-294104 A | 11/1998 | |
| JP | 2007-294423 A | 11/2007 | |
| JP | 2007-324271 A | 12/2007 | |
| JP | 2009-212074 A | 9/2009 | |
| JP | 2010-21100 A | 1/2010 | |
| JP | 2011-222151 A | 11/2011 | |
| JP | 2012-38686 A | 2/2012 | |
| JP | 2012-74189 A | 4/2012 | |
| JP | 2012-209195 A | 10/2012 | |
| WO | WO 98/33227 A1 | 7/1998 | |
| WO | WO 00/07255 A1 | 2/2000 | |
| WO | 2002-373657 A | 12/2002 | |
| WO | WO 03/003395 A1 | 1/2003 | |
| WO | WO 2004/097867 A2 | 11/2004 | |
| WO | WO 2010/071166 A1 | 6/2010 | |
| WO | WO 2011-102453 A1 * | 8/2011 | ........ H01M 10/0565 |

OTHER PUBLICATIONS

English translation of International Preliminary Report on Patentability and Written Opinion issued Nov. 20, 2014, in PCT International Application No. PCT/JP2013/062895.

Yamabe et al., "The structural analysis of various hydro-graphene species," Synthetic Materials (2004), vol. 145, pp. 31-36.

Yata et al., "Characteristics of deeply Li-doped polyacenic semiconductor material and fabrication of a Li secondary battery," Synthetic Metals (1995), vol. 73, pp. 273-277.

Yata et al., "Polymer Battery Employing Polyacenic Semiconductor," Synthetic Materials (1987), vol. 18, pp. 645-648.

Yata et al., "Structure and properties of deeply Li-doped polyacenic semiconductor materials beyond $C_6Li$ stage," Synthetic Metals (1994), vol. 62, pp. 153-158.

Yata et al., Kougyou Zairyou, vol. 40, No. 5, pp. 32-35 (1992).

Japanese Office Action, dated Dec. 15, 2015, for corresponding Japanese Application No. 2014-514729.

* cited by examiner

PREDOPING METHOD FOR LITHIUM, LITHIUM-PREDOPED ELECTRODE, AND ELECTRICITY STORAGE DEVICE

TECHNICAL FIELD

This invention relates to a simple, practical method for predoping silicon-base material with lithium, a method for preparing electrodes, and an electric energy storage device constructed using the methods.

BACKGROUND ART

In recent years, active efforts have been made to develop various types of high-energy-density batteries as the power source for compact-size portable devices as typified by mobile phones, nighttime power storage systems, household distributed electric energy storage systems based on photovoltaic power generation, electric energy storage systems for electric vehicles and the like. In particular, since lithium ion batteries have a volume energy density exceeding 350 Wh/L, and are superior in reliability in terms of safety and cycle performance, to lithium secondary batteries using metallic lithium as the negative electrode, the market for lithium ion batteries as the power source for compact portable devices is dramatically growing. Lithium ion batteries use a lithium-containing transition metal oxide such as $LiCoO_2$ or $LiMn_2O_4$ as the positive electrode and a carbon-base material, typically graphite as the negative electrode. While the current challenge is to develop lithium on batteries with a further increased capacity, the approach of increasing the capacity of lithium ion batteries by improving the positive electrode oxides and negative electrode carbon-base materials, which are on practical use, has almost reached the limit. It is thus difficult to meet the demand for high energy density from the equipment side. Further, in a combination of a high-efficiency engine with an electric energy storage system (for example, in hybrid electric vehicles), or in a combination of a fuel cell with an electric energy storage system (for example, in fuel cell electric vehicles), constant output operation is essential in order for the engine or the fuel cell to operate at a maximum efficiency. Thus, in order to accommodate output fluctuations or energy regeneration on the load side, high-power discharging characteristics and high-rate charging characteristics are demanded on the electric energy storage system side. To comply with these demands, in the area of electric energy storage systems, research and development is performed on lithium ion capacitors to increase the output of lithium ion batteries featuring high energy density, or to increase the energy density of electric double-layer capacitors featuring high output.

On the other hand, the technology of electric energy storage devices such as lithium ion batteries and capacitors has placed attention on the technique that increases the capacity and voltage of electric energy storage devices by preloading (hereinafter referred to as predoping) active materials with lithium ions. When the predoping technique is applied to high-capacity materials such as insoluble and infusible substrates having a polyacene skeletal structure as described in Patent Document 1, Non-Patent Documents 1, 2, and 3, for example, electric energy storage devices can be designed so as to take full advantage (high capacity) of the predoping technique as described in Non-Patent Document 4. This makes it possible to meet the demand for higher energy density or output in the electric energy storage device. Predoping technique has long been used in practice.

For example, Non-Patent Document 5 and Patent Document 2 disclose an electric energy storage device having high voltage and high capacity, in which an insoluble and infusible substrate having a polyacene skeletal structure, which is a negative electrode active material, is predoped with lithium. For lithium predoping, an electrochemical system in which an electrode to be predoped is used as the working electrode and lithium metal is used as the counter electrode is set up whereupon doping can be electrochemically performed. With this method, however, it is necessary to take the predoped electrode out of the electrochemical system and to reassemble it into a battery or capacitor. Therefore, as the practical predoping method, a method involving the steps of attaching a lithium metal foil to an active material-containing electrode to keep them in contact, injecting an electrolytic solution, and letting dope the active material with lithium has long been used. This method is effective for coin-type batteries having a small number of relatively thick electrodes. However, when the method is applied to multi-layer structure batteries having a plurality of thin electrodes laminated or roll structure batteries, there arise problems including a complicated process and handling of thin lithium metal. There remains a need for a simple and practical predoping method.

As one solution to the above problems, Patent Documents 3 to 6 disclose a predoping method using a perforated current collector. For example, Patent Document 3 discloses an organic electrolyte cell characterized in that current collectors are provided with pores extending between front and back surfaces, a negative electrode active material is capable of reversibly carrying lithium ions, lithium originating from the negative electrode is carried by electrochemical contact with a lithium layer, the lithium layer is opposed to the negative or positive electrode, and an opposed area of the lithium layer is up to 40% of the area of the negative electrode. In this cell, electrode layers are formed on current collectors provided with through-pores for short-circuiting lithium metal and the negative electrode arranged in the cell, whereby lithium ions pass through the through-pores of the current collector after injection of electrolytic solution, whereby the negative electrode is wholly doped. Patent Document 3 discloses in Example an organic electrolyte cell using an expanded metal as the perforated current collector, $LiCoO_2$ as the positive electrode active material, and an insoluble and infusible substrate having a polyacene skeletal structure as the negative electrode active material. The negative electrode active material may be easily predoped with lithium ions from the lithium metal arranged in the cell.

Also, it is disclosed that lithium metal powder is admixed in an electrode, or that lithium metal powder is uniformly dispersed on a negative electrode, a solution is injected therein, and local cells are constructed on the electrode, thereby absorbing lithium uniformly within the electrode, as described in Patent Document 7. Further, Patent Document 8 discloses a method involving admixing polymer-coated Li fine particles in a negative electrode material, forming a negative electrode, assembling a capacitor, impregnating the negative electrode with an electrolytic solution, dissolving away the polymer portion of the polymer-coated Li fine particles in the electrolytic solution to cause conduction (short-circuiting) between the Li metal and the carbon of the negative electrode, for thereby doping the carbon of the negative electrode with Li.

In all the above predoping techniques, once a battery or capacitor is assembled, an electrolytic solution is injected therein to start predoping. On the other hand, alternative methods are known, for example, a method of producing an electrode from a lithiated electrode material which is obtained by immersing an electrode material in a solution of n-butyl lithium in an organic solvent such as hexane, and reacting lithium with the electrode material (Patent Document 9); a method of intercalating lithium into graphite by reacting lithium kept in gas phase with graphite according to a process known as the Tow-Bulb process (Patent Document 10); and a method of mechanically alloying lithium by the mechanical alloying process (Patent Document 10).

As mentioned above, the predoping technique is important to the development efforts toward increasing the output of lithium ion cells or the energy density of capacitors, with a variety of predoping techniques being proposed. The predoping technique that is currently believed most practical is an electrochemical technique involving assembling a cell while an active material (electrode) and lithium are kept in direct contact or short-circuited via an electric circuit, and injecting an electrolytic solution therein, thereby achieving predoping. With this technique, however, a long time is necessary for achieving uniform doping throughout the material, metal lithium incorporated in the cell is not completely predoped, with some lithium being left, or lithium sites which are lost by predoping become vacancies to affect the internal resistance or other properties of the cell. Also, the use of perforated current collectors encounters the problem that the electrode material must be coated to the perforated collectors. The method of attaching a lithium metal foil to an active material-bearing electrode offers relatively high uniformity, but there are left many problems to be solved from the manufacture aspect, such as the problems of thickness accuracy and handling of a very thin lithium metal foil of up to 0.03 mm.

Also, a method of immersing an active material in a solution of alkyl lithium in an organic solvent such as hexane to directly predope the active material enables uniform predoping, but requires a large amount of lithium-containing reagent, as compared with the use of lithium metal as the lithium source, and very cumbersome steps of taking out the active material and separating the residual reagent at the end of reaction. Further, the doping techniques based on the Tow-Bulb process (gas phase) and mechanical alloying (solid phase) are difficult to implement in practice because the conditions are complex, special large-size equipment are necessary, and there are fatal problems including exposure of the material to be predoped to high temperature and breakage of material structure by grinding with violent forces.

As means for solving the above-mentioned problems, Patent Document 11 proposes a method of predoping a material with lithium by kneading and mixing a lithium-dopable material with lithium metal in the presence of a specific solvent for thereby simply predoping the material with lithium in the electrode preparing step. Patent Document 11 discloses in Example that when lithium metal foil of 0.03 mm thick is kneaded and mixed with polycyclic aromatic hydrocarbons (PAHs) obtained from thermal reaction of coal-based isotropic pitch at 680° C. and acetylene black in the presence of propylene carbonate, the lithium metal foil disappears, and the resulting mixture containing PAHs has a potential of 129 mV versus Li metal. Patent Document 11 describes that polycyclic aromatic hydrocarbons having a hydrogen/carbon atomic ratio of 0.05 to 0.5, such as insoluble/infusible substrates containing polyacene skeletal structure, carbon base materials, graphite base materials, conductive polymers, tin or tin oxide, silicon or silicon oxide, or the like may be used as the material to which the predoping method is applicable, but specifically describes nowhere the predoping conditions for each of these materials (e.g., silicon or silicon oxide) other than the polycyclic aromatic hydrocarbons and the predoped electrodes thereof.

On the other hand, as alluded to previously, efforts for improvements toward a higher capacity have been made by mainly using carbon materials such as graphite as the negative electrode material in lithium ion cells. However, the attempt to increase the capacity of carbon materials has almost reached the limit, and new high-capacity negative electrode materials of the next generation are proposed. One promising candidate of the next generation high-capacity negative electrode materials is a silicon-base material, with active development efforts being devoted thereon. For example, Patent Document 12 discloses, as the silicon-base material having a high capacity and improved cycle performance, silicon (Si), particles of composite structure having nanoparticles of silicon (Si) dispersed in a silicon-base compound, and a material obtained by covering the surface of silicon oxide of the general formula: SiOx (wherein $0.5 \leq x < 1.6$) with a graphite coating having a specific structure.

Also, Patent Document 13 discloses a negative electrode material for nonaqueous electrolyte secondary batteries, which is prepared by coating the surface of silicon-silicon oxide composite particles with a carbon coating, mixing the coated silicon-silicon oxide composite particles with a lithium dopant such as lithium hydride or lithium aluminum hydride, and heating the mixture for thereby doping the carbon-coated particles with lithium in the form of a compound, typically $Li_2SiO_3$. There are left some problems, for example, high-temperature heat treatment at 600° C. is necessary.

CITATION LIST

Patent Documents

Patent Document 1: JP-A S59-3806
Patent Document 2: JP-A H03-233860
Patent Document 3: WO 98/33227
Patent Document 4: WO 00/07255
Patent Document 5: WO 03/003395
Patent Document 6: WO 04/097867
Patent Document 7: JP-A H05-234621
Patent Document 8: JP-A 2007-324271
Patent Document 9: JP-A H10-294104
Patent Document 10: JP-A 2002-373657
Patent Document 11: JP-A 2012-38686
Patent Document 12: JP-A 2009-212074
Patent Document 13: JP-A 2011-222151

Non-Patent Documents

Non-Patent Document 1: T. Yamabe, M. Fujii, S. Mori, H. Kinoshita, S. Yata, Synth. Met., 145, 31 (2004)
Non-Patent Document 2: S. Yata, Y. Hato, K. Sakurai, T. Osaki, K. Tanaka, T. Yamabe, Synth. Met., 18, 645 (1987)
Non-Patent Document 3: S. Yata, H. Kinoshita, M. Komori, N. Ando, T. Kashiwamura, T. Harada, K. Tanaka, T. Yamabe, Synth. Met., 62, 153 (1994)
Non-Patent Document 4: S. Yata, Y. Hato, H. Kinoshita, N. Ando, A. Anekawa, T. Hashimoto, M. Yamaguchi, K. Tanaka, T. Yamabe, Synth. Met., 73, 273 (1995)
Non-Patent Document 5: S. Yata, Kougyou Zairyou, Vol. 40, No. 5, 32 (1992)

SUMMARY OF INVENTION

Technical Problem

As demonstrated in Example of Patent Document 12, the above-mentioned silicon-base material has a discharge capacity of 1526 mAh/g which is at least 4 times greater than the theoretical capacity (372 mAh/g) of graphite and is successful in improving the cycle performance which is the outstanding problem of silicon-base materials. However, the silicon-base material has a first cycle charge/discharge efficiency of about 70 to 80% and a first cycle irreversible capacity of about 300 to 400 mAh/g which is beyond the theoretical capacity of graphite. Because of this magnitude of irreversible capacity, a problem arises in a lithium ion battery comprising a negative electrode of silicon-base material and a positive electrode of lithium-containing metal oxide such as $LiCoO_2$. That is, despite the high capacity of the silicon-base material, the battery fails to take full advantage of the silicon-base material's capability (high capacity). A further problem is that the silicon-base material undergoes a substantial volume change (expansion and shrinkage) in electrode form in response to doping and dedoping of lithium, and the volume change invites a decline of capacity during cycle operation.

The inventor conducted further research while paying attention to the problems of the prior art as discussed above. The inventor has found that a silicon-base material can be simply predoped with lithium by kneading and mixing the silicon-base material and lithium metal in the presence of a specific solvent, whereby the first cycle charge/discharge efficiency which is the outstanding problem of silicon-base materials can be significantly improved. It has also been found that when an electric storage device is constructed using as the negative electrode an electric storage device electrode formed of a negative electrode material comprising lithium-predoped silicon-base material and a binder, the volume change (expansion and shrinkage) of the electrode in response to doping/dedoping of lithium is suppressed. Specifically, the invention has the following features and solves the above problems.

[1] A lithium predoping method comprising kneading and mixing lithium metal with a silicon-base material capable of absorbing and desorbing lithium ions in the presence of a solvent, said silicon-base material being selected from among (a) silicon and a composite dispersion of silicon and silicon dioxide, (b) particles of the formula: SiOx (wherein $0.5 \leq x < 1.6$) having a microstructure wherein silicon nanoparticles are dispersed in a silicon-base compound, and (c) a lower silicon oxide of the above formula, alone or in admixture of two or more.

[2] The lithium predoping method of [1] wherein the surface of the silicon-base material is coated with a carbon coating which is 1 to 40% by weight of the silicon-base material.

[3] The lithium predoping method of [1] or [2] wherein the solvent is selected from among carbonates, lactones, sulfolanes, ethers, and hydrocarbons, alone or in admixture of two or more, and is inert to lithium metal and lithium-doped silicon-base material.

[4] The lithium predoping method of any one of [1] to [3] wherein the solvent is inert to lithium metal and lithium-doped silicon-base material and has a boiling point of at least 150° C.

[5] The lithium predoping method of any one of [1] to [4] wherein the silicon-base material and lithium metal are kneaded and mixed in the presence of a solvent using a thin-film spin high-speed kneader.

[6] The lithium predoping method of any one of [1] to [5] wherein the silicon-base material and lithium metal having a thickness of at least 0.1 mm are pre-kneaded in the presence of a solvent, and thereafter, kneaded and mixed using a thin-film spin high-speed kneader.

[7] A negative electrode material for electric storage devices, comprising a silicon-base material capable of absorbing and desorbing lithium ions which is predoped with lithium by the method of any one of [1] to [6], the silicon-base material being selected from among (a) silicon and a composite dispersion of silicon and silicon dioxide, (b) particles of the formula: SiOx (wherein $0.5 \leq x < 1.6$) having a microstructure wherein silicon nanoparticles are dispersed in a silicon-base compound, and (c) a lower silicon oxide of the above formula, alone or in admixture of two or more, or the silicon-base material surface coated with 1 to 40% by weight of a carbon coating.

[8] An electrode for electric storage devices, comprising the negative electrode material of [7] in the form of lithium-predoped silicon-base material and a binder.

[9] The electrode of [8] wherein the binder is a polyimide resin or polyamide-imide resin.

[10] The electrode of [8] or [9] wherein the electrode has been heated at a temperature of at least 200° C.

[11] The electrode of any one of [8] to [10], further comprising conductive fibers as conductive agent.

[12] The electrode of [11] wherein the fibrous conductive fibers are vapor grown carbon fibers.

[13] An electric storage device comprising the electrode of any one of [8] to [12].

Advantageous Effects of Invention

The predoping method of the invention has the advantage that a silicon-base material capable of absorbing and desorbing lithium (sometimes referred to as "dopable silicon-base material," hereinafter) can be doped with lithium easily and uniformly without resorting to any electrochemical means. When an electrode or electric storage device is manufactured using the silicon-base material predoped with lithium by the inventive method, the pending problems of the prior art methods including predoping time, deficient uniformity, and manufacturing troubles arising from the use of perforated current collector and extremely thin lithium metal foil are solved. Further, when an electric storage device is constructed using an electrode of a negative electrode material comprising lithium-predoped silicon-base material and a binder, the volume change (expansion and shrinkage) of the electrode in response to doping and dedoping of lithium, that has impact on the cycle performance, is suppressed.

DESCRIPTION OF EMBODIMENTS

Figure 1:
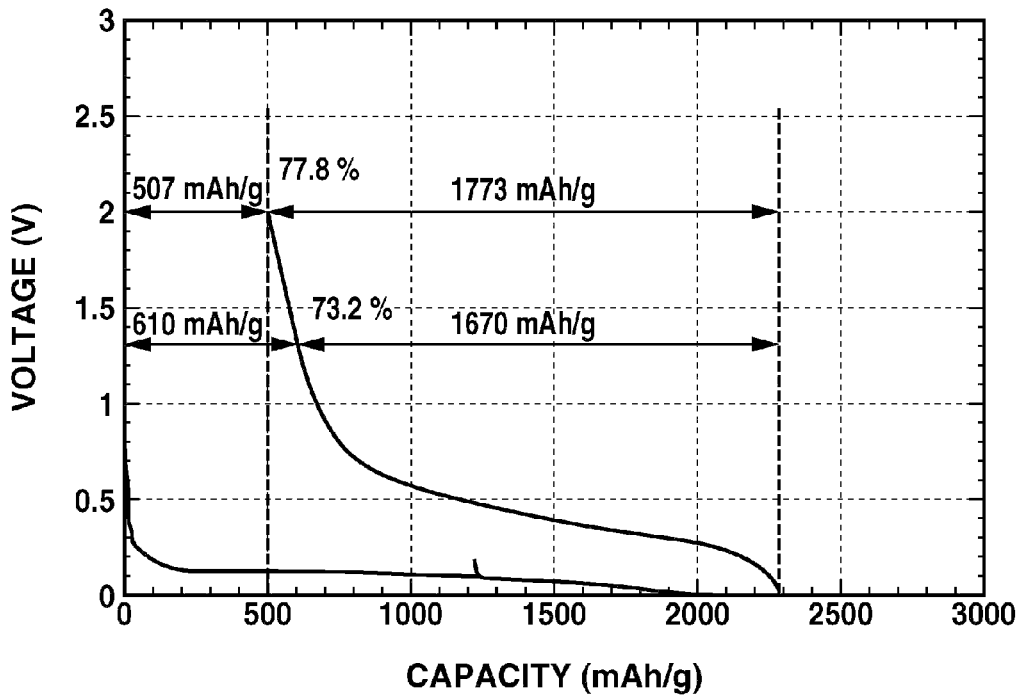
FIG. 1 illustrates Preparation Example 1 (Example 1) and is a diagram showing a voltage profile followed by an electrode of silicon-base material (non-predoped) upon doping and dedoping of lithium.

One embodiment of the invention is described below. The invention is directed to a method for predoping a silicon-base material comprising the step of kneading and mixing lithium metal with a silicon-base material capable of absorbing and desorbing lithium ions in the presence of a solvent, the silicon-base material being selected from among (a) silicon and a composite dispersion of silicon and silicon dioxide, (b) particles of the formula: SiOx (wherein $0.5 \le x < 1.6$) having a microstructure wherein silicon nanoparticles are dispersed in a silicon-base compound, and (c) a lower silicon oxide of the above formula, alone or in admixture of two or more. Notably Si designates silicon. The lithium-dopable silicon-base material used herein is not particularly limited as long as it is a material capable of absorbing and desorbing lithium (absorbing is described in various different terms like intercalation, doping, insertion, occlusion, loading, and alloying, which are collectively referred to as doping or dope in the present disclosure).

The lithium-dopable silicon-base material used herein is (a) silicon and a composite dispersion of silicon and silicon dioxide, (b) particles of the formula: SiOx (wherein $0.5 \le x < 1.6$) having a microstructure wherein silicon oxide or silicon nanoparticles are dispersed in a silicon-base compound, or (c) a lower silicon oxide of the above formula. Especially silicon (metallic silicon) having a high theoretical charge/discharge capacity, particles having a microstructure wherein silicon nanoparticles are dispersed in a silicon-base compound, and a material obtained by coating the surface of silicon oxide with 1 to 40 wt % of a carbon coating (described in Patent Document 12: JP-A 2009-212074) are more effective for the invention because of their high capacity and improved cycle performance.

In this embodiment, although silicon and particles having a microstructure wherein silicon nanoparticles are dispersed in a silicon-base compound are not particularly limited in physical properties, the average particle size is preferably 0.01 to 50 μm, more preferably 0.1 to 10 μm. If the average particle size is less than 0.01 μm, there may occur a drop of purity due to surface oxidation, a drop of charge/discharge capacity, a drop of bulk density, and a drop of charge/discharge capacity per unit volume. Inversely, if the average particle size exceeds 50 μm, there is a risk that when particles are surface coated with a carbon coating, the amount of carbon deposited during chemical vapor deposition will decrease, resulting in a degradation of cycle performance.

It is noted that the average particle size may be expressed by a weight average particle diameter in particle size distribution measurement by the laser light diffractometry.

For the particles having a microstructure wherein silicon nanoparticles are dispersed in a silicon-base compound, the silicon-base compound is preferably an inert compound, and silicon dioxide is more preferable for ease of preparation. Preferably the particles possess the following characteristics.

(i) On analysis by x-ray diffraction (Cu-Kα) using copper as the counter cathode, a diffraction peak attributable to Si(111) is observed as centering near 2θ=28.4°, and silicon crystal grains have a grain size of 1 to 500 nm, more preferably 2 to 200 nm, even more preferably 2 to 20 nm as determined by Scherrer equation based on the spread of the diffraction peak. If silicon nanoparticles have a grain size of less than 1 nm, a reduction of charge/discharge capacity may be observed. If the grain size is more than 500 nm, substantial expansion and contraction may occur during charge/discharge cycles, leading to a decline of cycle performance. It is noted that the size of silicon nanoparticles is measured by transmission electron microscope (TEM) photomicrography.

(ii) On analysis by solid-state NMR ($^{29}$Si-DDMAS), a broad peak of silicon dioxide centering at approximately −110 ppm and a peak characteristic of Si diamond crystals near −84 ppm appear in the spectrum. It is noted that this spectrum is entirely different from that of ordinary silicon oxide (SiOx wherein x=1.0+α), indicating that the structure itself apparently differs from the latter. It is confirmed by observation under TEM that silicon crystals are dispersed in amorphous silicon dioxide.

The amount of silicon (Si) nanoparticles dispersed in the silicon/silicon dioxide ($Si/SiO_2$) dispersion is preferably about 2 to 36% by weight, more preferably about 10 to 30% by weight. A dispersed silicon amount of less than 2 wt % may lead to a drop of charge/discharge capacity whereas a dispersed silicon amount in excess of 36 wt % may lead to a drop of cycle performance.

The method of preparing the particles having a microstructure wherein silicon nanoparticles are dispersed in a silicon-base compound (silicon composite powder) is not particularly limited as long as the particles are particles having a structure wherein silicon crystallites are dispersed in a silicon-base compound, preferably having an average particle size of 0.01 to 50 μm. For example, one appropriate method which can be used herein is by heat treating a silicon oxide powder of the general formula: SiOx wherein $0.5 \le x < 1.6$, preferably $1.0 \le x < 1.6$, in an inert gas atmosphere at a temperature in the range of 900 to 1,400° C. for inducing disproportionation.

As used herein, the term "silicon oxide" generally refers to amorphous silicon oxides obtained by heating a mixture of silicon dioxide and metallic silicon to produce a silicon monoxide gas and cooling the gas for precipitation. The silicon oxide powder used herein is represented by the general formula: SiOx and preferably has an average particle size of at least 0.01 μm, more preferably at least 0.1 μm, even more preferably at least 0.5 μm, with the upper limit being preferably up to 30 μm, more preferably up to 20 μm. The silicon oxide powder preferably has a BET specific surface area of at least 0.1 m$^2$/g, more preferably at least 0.2 m$^2$/g, with the upper limit being preferably up to 30 m$^2$/g, more preferably up to 20 m$^2$/g. The range of x is $0.5 \le x < 1.6$, preferably $1.0 \le x < 1.6$, even more preferably $0.8 \le x < 1.3$, and most preferably $0.8 \le x \le 1.2$. If the average particle size and BET surface area of silicon oxide powder are outside the ranges, a silicon composite powder having the desired average particle size and BET surface area may not be obtained. It is difficult to prepare SiOx powder wherein x<0.5. If x≥1.6, heat treatment for disproportionation reaction may result in an increased content of inert $SiO_2$, and on use of the resulting powder in electric storage devices, the charge/discharge capacity may become low.

In disproportionation of silicon oxide, a heat treatment temperature below 900° C. may be inefficient because disproportionation does not take place at all or formation of minute cells or crystallites of silicon becomes time-consuming. If the temperature is above 1,400° C., the structuring of silicon dioxide proper is promoted to such an extent as to impede motion of lithium ions, leaving a risk of damaging the function as a lithium ion secondary battery. The preferred heat treatment temperature is 1,000 to 1,300° C., especially 1,100 to 1,250° C. The treatment (or disproportionation) time may be selected in the range of about 10 minutes to 20 hours, especially about 30 minutes to 12 hours, depending on the disproportionation treatment temperature. At a treatment temperature of 1,100° C., for example, a silicon composite powder (disproportionated product) having the desired physical properties is obtained within a time of about 5 hours.

For the disproportionation treatment, a reactor having a heating mechanism may be used in an inert gas atmosphere, with the reactor being not particularly limited. Depending on a particular purpose, a reactor capable of either continuous or batchwise treatment may be selected from, for example, a fluidized bed reactor, rotary furnace, vertical moving bed reactor, tunnel furnace, batch furnace and rotary kiln. The treating gas used herein may be a gas which is inert at the treatment temperature, such as Ar, He, $H_2$ or $N_2$ alone or a mixture thereof.

The lithium-dopable silicon-base material used herein is preferably the above-described material coated on surface with a carbon coating. The coating technique is preferably chemical vapor deposition (CVD) or the like.

Described below is the lithium-dopable silicon-base material which is surface coated with a carbon coating according to the invention. The amount of carbon coating covering the surface of the lithium-dopable silicon-base material is not particularly limited, but is preferably 1 to 40% by weight based on the lithium-dopable silicon-base material. A carbon coating amount of less than 1 wt % may fail to maintain a sufficient conductivity, resulting in a decline of cycle performance when a negative electrode material for electric storage devices is formulated. Inversely, if the carbon coating amount exceeds 40 wt %, no improvements in the effect are observed, and an increased proportion of carbon in the lithium-dopable silicon-base material may result in a decline of charge/discharge capacity when a negative electrode material for electric storage devices is formulated.

Although the shape of the lithium-dopable silicon-base material is not particularly limited, a suitable choice may be made among spherical particles, irregular shape particles, and fibers. Preference is given to the shape which allows the silicon-base material after lithium predoping to be directly fed to the electrode manufacture step without interposing grinding and other steps. The shape is determined while taking into account the thickness and density (porosity) of the electrode, or the input/output properties, reliability and safety of the intended electric storage device. For example, the average particle size of spherical particles and irregular shape particles, or the average length of fibers is preferably up to 50 μm, more preferably up to 30 μm, and even more preferably up to 10 μm, and the lower limit is practically at least 0.01 μm, preferably at least 0.1 μm, and more preferably at least 0.5 μm.

The predoping method of the invention is characterized by kneading and mixing the lithium-dopable silicon-base material with lithium metal in the presence of a specific solvent to be described later. That is, the predoping method is quite simple and novel (unknown in the prior art) in that only the step of kneading and mixing the lithium-dopable silicon-base material with lithium metal in the presence of a specific solvent is involved. With the predoping method, not only lithium metal, but also lithium alloys such as lithium-aluminum alloy may be similarly used for predoping. However, when lithium-aluminum alloy is used, for example, there arises a problem that aluminum is left behind after predoping.

The shape of lithium metal used herein is not particularly limited, and any of various shapes including mass, foil, particles, powder and fibers may be applicable. Preference is given to a thin or fine shape having a large surface area when a predoping rate is taken into account, or to a shape having a small surface area when handling of lithium metal, productivity and the impact of predoping atmosphere are taken into account. As a consequence, use may be made of a foil having a thickness of up to 1 mm and at least 0.005 mm, preferably up to 0.5 mm and at least 0.01 mm, or pieces obtained by finely dividing a lithium metal foil to a size of up to 5 mm, desirably up to 2 mm, or particles or powder of lithium metal having a particle size of up to 1 mm and at least 0.005 mm, preferably up to 0.5 mm and at least 0.01 mm, more preferably up to 0.5 mm and at least 0.05 mm. Within the range, the thickness (or particle size) is desirably at least 0.1 mm and up to 1 mm, more desirably at least 0.1 mm and up to 0.5 mm, and most desirably at least 0.1 mm and up to 0.3 mm when the prevention of lithium metal fragments from remaining after the kneading/mixing step, predoping rate, and productivity are taken into account. Further, lithium metal coated with a polymer or the like may be used as long as the lithium metal in its entirety or in part will come into contact with the lithium-dopable silicon-base material during the kneading/mixing step to be described below.

It is preferable, as a matter of course, that the solvent used herein be selected from those solvents which are non-reactive with lithium metal and the lithium-dopable silicon-base material as predoped with lithium. Lithium metal and the lithium-dopable silicon-base material have a strong reducing power so that they can react with the solvent or serve as a catalyst for polymerization of the solvent. The reaction referred to herein is a continuously running reaction. In one exemplary situation wherein the lithium-dopable silicon-base material as predoped with lithium reacts with a solvent, the resulting reaction product forms a passive coating on the surface of the material, the passive coating inhibits subsequent reaction between the lithium-dopable silicon-base material as predoped with lithium and the solvent, and the reaction no longer runs continually, then this solvent can be used. In another situation wherein a solvent contains a minute amount of a reactive component, the reactive component is entirely consumed for reaction, and so the reaction stops, then this solvent can be used. In a further situation wherein reaction between a solvent and lithium metal or the lithium-dopable silicon-base material as predoped with lithium is slow, and the reaction that has took place before the solvent is removed scarcely affects the characteristics of the electric storage device, then this solvent can be used.

The solvent used herein is typically one or a mixture of two or more compounds selected from among carbonates, lactones, sulfolanes, ethers, and hydrocarbons, and preferably one or a mixture of two or more compounds selected from among cyclic carbonates, lactones, sulfolanes, ethers, and hydrocarbons. Suitable organic solvents include cyclic carbonates such as propylene carbonate and ethylene carbonate, linear carbonates such as diethyl carbonate, dimethyl carbonate and methyl ethyl carbonate, ethers such as dimethoxyethane, diethylene glycol dimethyl ether (diglyme) and dioxane, lactones such as gamma-butyrolactone, sulfolanes, and esters such as methyl acetate and methyl formate, which may be used alone or in admixture of two or more. Hydrocarbons such as hexane, dodecane and decalin may also be used. It is preferable that the solvent used herein does not have a fatal impact such as decomposition during the charging/discharging operation of an electric storage device such as a battery or capacitor, produced using the lithium-doped silicon-base material. Also preferably, the solvent has a boiling point of at least 150° C., and more preferably at least 200° C., for the reason to be described later. Further, it is preferable, as a matter of course, that the solvent have a low water content. Specifically, the use of a solvent having a water content of up to 1,000 ppm, preferably up to 500 ppm, and more preferably up to 200 ppm minimizes the reaction with lithium metal or the lithium-doped silicon-base material.

Now the predoping method of the invention is described. According to the prior art predoping methods alleged practical, predoping is performed in an electrolytic solution containing a lithium salt, by bringing an electrode containing a lithium-dopable silicon-base material and lithium metal into direct contact or electrical short-circuits. In stark contrast to these prior art methods, the predoping method of the invention is characterized in that predoping is achieved by kneading and mixing a lithium-dopable silicon-base material and lithium metal together in the presence of a solvent prior to formation of an electrode. Although the solvent used during the predoping step may contain an electrolyte such as a lithium salt, the electrolyte which can be carried over in the electrode produced must be carefully managed because it may otherwise affect subsequent steps.

The invention is based on the discovery that predoping progresses by kneading and mixing a lithium-dopable silicon-base material and lithium metal in a solvent even when the solvent is free of an electrolyte such as a lithium salt.

Below the predoping method of the invention is described. The method of the invention is not limited in any sense by the following description as long as it involves the essential step of kneading and mixing a lithium-dopable silicon-base material and lithium metal in the presence of the solvent defined above. First, the lithium-dopable silicon-base material is furnished in a suitable shape selected from among spherical particles, irregular shape particles, and fibers, while it is preferable to dry the material to remove water as much as possible. Preferably the material has a water content of up to 1,000 ppm, more preferably up to 200 ppm. The lithium-dopable silicon-base material is mixed with the solvent, to which lithium metal of a suitable shape selected from among a mass, foil, particles, powder, and fibers is added, and kneading and mixing is continued. At this point, it is recommended to gradually add plural divided portions of lithium metal rather than adding the predetermined amount of lithium metal at a time, because efficient instant predoping is possible. The number of divided portions of lithium metal to be added may be reduced by a proper choice of the thickness (or particle diameter) and size of lithium metal, kneading/mixing procedure, and kneader/mixer.

While the predoping method of the invention is by kneading and mixing a lithium-dopable silicon-base material and lithium metal in the presence of a solvent for thereby predoping the material with lithium, it is the point of significance how to increase the chances of doping the lithium-dopable silicon-base material with lithium. While the prior art in-cell predoping method (wherein predoping is performed in a lithium salt-containing electrolytic solution by bringing an electrode containing a lithium-dopable silicon-base material and lithium metal into direct contact or electrical short-circuits) relies on predoping via lithium ions in the electrolytic solution, the predoping method of the invention is devised such that chances of doping are created by bringing lithium metal in direct contact with a lithium-dopable silicon-base material via kneading and mixing in the presence of a solvent. Consequently, in order to promote uniform predoping within a short time, stress must be applied to the lithium-dopable silicon-base material and lithium metal during the kneading/mixing step in the presence of a solvent. A shortage of stress raises problems, for example, the predoping time becomes longer, uniform predoping is inhibited by the residual lithium metal, and agglomerates are left in the electrode formation step to interfere with electrode coating.

Specific means of applying stress to the lithium-dopable silicon-base material and lithium metal during the kneading/mixing step is illustrated below while the kneading/mixing procedure and the magnitude of applied stress may be selected as appropriate depending on the physical parameters (shape, specific surface area) of the lithium-dopable silicon-base material, the shape of lithium metal, the amount of lithium predoped, heat generation during predoping, and the like.

The ratio of the lithium-dopable silicon-base material and the solvent varies depending on the physical parameters (e.g., shape, specific surface area) of the material. Preferably the ratio is adjusted so that a mixture of the lithium-dopable silicon-base material and the solvent may become clay-like or have a high viscosity, whereupon the mixture is kneaded and mixed with lithium metal in a so-called stiff paste kneading manner. The amount of the solvent needed to establish this state is determined as appropriate depending on the true density, specific surface area, shape, and other physical parameters of the lithium-dopable silicon-base material and the type of solvent. Typically, the solvent amount is about 10% to 300% based on the weight of the lithium-dopable material. The kneading/mixing operation may be performed on a general-purpose machine capable of kneading and mixing high-viscosity materials. Kneading may be performed using a mortar or the like on an experimental basis, or a roll mill, planetary mixer, rotation/revolution mixer or the like on a commercial production basis. Also, kneading and mixing may be performed on a kneader/mixer using balls such as a ball mill, planetary ball mill or bead mill or on a rotation/revolution mixer loaded with balls. On the other hand, when kneading and mixing is performed on the general-purpose machine capable of kneading and mixing high-viscosity materials, lithium metal must be added in small divided portions because of the tendency that fragments of lithium metal are left behind. In one procedure which is acceptable from the standpoint of productivity, first lithium metal and lithium-dopable silicon-base material are preliminarily kneaded and mixed in the presence of a solvent on the general-purpose machine capable of kneading and mixing high-viscosity materials, the solvent is then added to the mixture until it assumes a flowing state having a low viscosity (e.g., 10 Pa·s or less), and the mixture is subjected to kneading/mixing step involving collision and friction with balls on a kneader/mixer using balls such as a ball mill, planetary ball mill or bead mill or on a rotation/revolution mixer loaded with balls. When the mixture in flowing state is to be kneaded and mixed, for example, a thin-film spin high-speed kneader (e.g., Filmix by Primix Corp.) is used, whereby the mixture even in flowing state can be kneaded and mixed under application of strong shear forces (or stresses). Since this procedure shortens the kneading/mixing time and facilitates efficient cooling of the heat generated during kneading/mixing and designing of continuous steps, it is a preferable kneading/mixing procedure applicable to the predoping method of the invention.

Besides the lithium-dopable silicon-base material and lithium metal, a conductive substance, binder or the like may also be added during the aforementioned kneading/mixing step.

The predoping step may be performed in dry air having a moisture content of up to 250 ppm, preferably up to 100 ppm, an inert gas atmosphere such as argon, a closed system capable of blocking incidental entry of water, or vacuum where lithium metal can be handled in safety. Since the evaporation of the solvent during mixing disturbs uniform mixing of lithium metal or facilitates reaction of the predoped material with water or the like, the solvent used should desirably have a boiling point of at least 150° C., more desirably at least 200° C.

In this way, there is obtained a negative electrode material for electric storage devices, comprising a silicon-base material which is selected from a silicon-base material capable of absorbing and desorbing lithium ions selected from among (a) silicon and a composite dispersion of silicon and silicon dioxide, (b) particles of the formula: SiOx (wherein $0.5 \leq x < 1.6$) having a microstructure wherein silicon nanoparticles are dispersed in a silicon-base compound, and (c) a lower silicon oxide of the above formula, alone or in admixture of two or more, and (d) a carbon-coated silicon-base material obtained by coating the surface of the foregoing silicon-base material with a carbon coating which is 1 to 40% by weight of the silicon-base material, the silicon-base material being predoped with lithium. Notably the negative electrode material is sometimes referred to as lithium-doped silicon-base material, hereinafter.

Since the lithium-doped silicon-base material can be handled in the solvent-impregnated state, it is relatively stable against moisture or the like in the atmosphere. Thus, using the silicon-base material predoped with lithium by the inventive method, an electrode for electric storage devices can be produced according to the invention. The electrode comprises at least the lithium-doped silicon-base material and a binder, and optionally, a conductive agent and the like. Except that the lithium-doped silicon-base material containing the solvent is used, the electrode can be produced by any well-known techniques such as coating, sheet forming, and pressing techniques. Described below is the method of producing an electrode for electric storage devices from the lithium-doped silicon-base material using the coating technique.

The method of producing an electrode for electric storage devices using the lithium-doped silicon-base material involves (1) a predoping step of kneading and mixing a lithium-dopable silicon-base material and lithium metal in the presence of a solvent to dope the lithium-dopable silicon-base material with lithium (the step may take place simultaneously with a slurry preparation step), (2) a slurry preparation step of adding a binder to the mixture resulting from the previous step and evaporating the solvent from or adding a solvent to the mixture to form a coatable slurry, (3) a coating step of coating the slurry to a current collector, and (4) a drying step of drying the slurry coated to the current collector. The predoping step (1) is as described above. If necessary from consideration of the desired electrode physical properties, the drying step (4) may be followed by a press step of compressing the electrode to a predetermined electrode density. With respect to these steps, the steps of the existing electrode producing methods are applicable, although a choice of solvent used and adjustment of atmosphere are necessary during the lithium metal kneading/mixing and electrode forming steps.

The method of producing an electric storage device electrode using the predoping method of the invention involves the step of preparing a coatable slurry comprising at least the lithium-doped silicon-base material, binder, and solvent, which is described below. In this step, a coatable slurry comprising the lithium-doped silicon-base material resulting from the predoping step, binder, and solvent is prepared. It is also possible to prepare a slurry comprising the lithium-doped silicon-base material, binder, and solvent, with which components necessary for electrode production, for example, a conductive agent such as fibrous conductive agent, carbon substance (e.g., carbon black, acetylene black or graphite) or metal, a thickener and the like are mixed. The order of mixing these components is determined in consideration of dispersibility in the slurry, convenience of preparation, and other factors, while these components may be previously mixed in the predoping step. For the electrode comprising the lithium-doped silicon-base material and binder, it is desirable to add conductive fibers, especially vapor grown carbon fibers as the conductive agent because the effect of improving the initial charge/discharge efficiency is readily exerted.

While the binder used in the production of electric storage device electrode using the predoping method of the invention is not particularly limited, it is important that the binder be able to bind the lithium-doped silicon-base material and not reactive with the lithium-doped silicon-base material like the solvent used in the predoping. Examples of the binder include well-known binders used in negative electrodes for lithium ion batteries, well-known polymers for gel electrolytes used in lithium ion batteries, and well-known polymers for solid electrolytes used in lithium ion batteries. Specific examples of the binder include polyvinylidene fluoride (PVDF), poly(vinylidene fluoride-hexafluoropropylene) (PVDF-HFP) copolymers, fluoro-rubbers, SBR, polyether-based polymers, polyethylene, and polypropylene. Inter alia, polyimide and polyamide-imide resins are preferred from the aspects of an improvement in initial charge/discharge efficiency and reliability such as cycle performance. The binder may be either soluble or insoluble or swellable in the slurry solvent while the type and amount of the binder may be determined in consideration of its binding power with the lithium-doped silicon-base material. Although the amount of the binder mixed is not particularly limited, it is 1% to 30% and preferably 2% to 20% based on the weight of the lithium-doped silicon-base material.

In the slurry preparation step involved in the method for the production of electric storage device electrode using the predoping method of the invention, a solvent may be newly added, if necessary, in addition to the solvent used for kneading/mixing in the predoping step, to adjust the slurry to a sufficient viscosity to coat. The solvent used herein may be the same as used in the predoping step or different in consideration of drying or other conditions. Like the solvent used in predoping, it is important that the solvent be not reactive with the lithium-doped silicon-base material. With respect to water content, a solvent having a water content of preferably up to 1,000 ppm, more preferably up to 500 ppm, and even more preferably up to 200 ppm is used. The solvent used in the predoping step or the solvent used in the slurry adjustment step may be determined in consideration of the solubility and swellability of the binder. The slurry is prepared in an atmosphere which may be dry air having a water content of up to 250 ppm, preferably up to 100 ppm, an inert gas such as argon or vacuum.

The slurry thus obtained is applied or coated to a current collector. Since the lithium-doped silicon-base material is applied, it is not particularly necessary in the practice of the invention to use a perforated foil current collector, which is necessary for predoping in the prior art, and an ordinary metal foil such as copper foil or aluminum foil may be used as the current collector.

In the method for the production of electric storage device electrode using the predoping method of the invention, the coating step is followed by the step of drying the solvent. The drying step is sufficient to dry the solvent to a level that allows for electric storage device assembly. For example, it suffices that the solvent is dried to a level of up to 30% based on the weight of the electrode, with complete removal of the solvent being unnecessary. With respect to drying, JP-A 2012-38686 describes that the preferred temperature range is up to 160° C. for the reason that the predoped lithium can be deactivated by heating. However, it has been confirmed for the lithium-doped silicon-base material that predoped lithium is not deactivated even at high temperatures. The drying temperature, though it varies depending on the binder used and the drying time, is preferably up to 450° C., more preferably up to 350° C., and even more preferably up to 250° C. The lower limit of the drying temperature which depends on the solvent used is preferably at least 70° C., more preferably at least 90° C., for example, when a solvent having a boiling point of at least 150° C. is used. The drying step is preferably performed to a water content of up to 100 ppm, more preferably up to 50 ppm, and even more preferably up to 25 ppm. In case complete drying has a possibility that predoped lithium will be deactivated during subsequent assembly and shelf storage of electric storage devices, the risk of deactivating lithium can be avoided by keeping the solvent in a content of at least 10% based on the weight of the lithium-doped silicon-base material Prior to battery assembly, the electric storage device electrode comprising the lithium-doped silicon-base material produced by the method may be heated at a temperature of at least 200° C. This heating is effective in obtaining the effect of improving the initial charge/discharge efficiency and the effect of improving reliability such as cycle performance, particularly when polyimide or polyamide-imide resin is used as the binder. This heating may be incorporated in the electrode drying step, or if the drying step is followed by a pressing step, performed after the pressing step.

The electric storage device electrode comprising the lithium-doped silicon-base material produced by the method (involving the predoping method of the invention) may be combined with a positive electrode, a separator, and a nonaqueous electrolytic solution of a lithium salt in a nonaqueous solvent, to construct an electric storage device such as a lithium ion battery or lithium ion capacitor. As used herein, the positive electrode, the separator, and the nonaqueous electrolytic solution of a lithium salt in a nonaqueous solvent may be selected from well-known materials which can be used in electric storage devices such as lithium ion batteries and lithium ion capacitors. Since a cell is produced according to the invention using the electrode comprising the lithium-doped silicon-base material, production is possible through steps similar to those of conventional existing production methods not involving the predoping step.

Using the lithium predoping method and the electrode production method of the present invention, electric storage devices such as lithium ion batteries and lithium ion capacitors, to which the predoping step is viable, can be easily produced in a short time.

Examples are given below to further clarify the features of the invention, but the invention is not limited thereto.

EXAMPLES

Preparation Example 1

A slurry was prepared using 92 parts of negative electrode material (KSC-1064 by Shin-Etsu Chemical Co., Ltd.) in the form of silicon oxide: SiOx (x=1.02) having an average particle size of 5 µm coated with 5 wt % carbon, 8 parts of polyvinylidene fluoride (PVDF, HSV900 by Arkema) as binder, and propylene carbonate (PC) as solvent. The slurry was coated onto a copper foil, dried at 120° C. for 10 minutes, and pressed into an electrode having a thickness of 18 µm and a density of 1.17 g/cm$^3$ (excluding copper foil). Using the electrode punched to a diameter of 17 mm, lithium metal as the counter electrode, and a solution of LiPF$_6$ in a solvent mixture of ethylene carbonate and methyl ethyl carbonate in a weight ratio of 3:7, having a concentration of 1 mol/L as the electrolytic solution, doping/dedoping of lithium was electrochemically performed. Specifically, lithium was doped or absorbed by the constant current (400 mA/g relative to the weight of lithium-dopable silicon-base material)-constant voltage (voltage 1 mV vs. Li/Li$^+$) method (time: 8 hours), and thereafter, lithium was dedoped or desorbed at a constant current (400 mA/g relative to the weight of lithium-dopable silicon-base material) until a voltage (2.0 V vs. Li/Li$^+$) was reached. There were marked a lithium doping amount of 2280 mAh/g and a lithium dedoping amount of 1773 mAh/g relative to the lithium-dopable silicon-base material, and an efficiency of 77.8%, demonstrating a possibility of absorbing and desorbing lithium ions. FIG. 1 shows a voltage profile upon doping (absorbing) and dedoping (desorbing).

Example 1

Predoping

In an argon dry box having a moisture content of up to 1 ppm, 0.25 g of the lithium-dopable silicon-base material and 0.31 g of propylene carbonate (b.p. 242° C.) having a water content of up to 30 ppm were added and mixed in a mortar. To the clay-like mixture thus obtained, pieces of about 10 mm squares cut from lithium metal foil of 0.03 mm thick were added in divided portions of each about 0.008 g for incorporation while kneading/mixing was continued. By following the procedure of adding lithium metal after complete disappearance of previous lithium metal, lithium metal was kneaded and mixed in a total amount of 0.05 g (corresponding to 760 mAh/g relative to the weight of lithium-dopable silicon-base material). At the end of kneading/mixing, the lithium metal foil added had completely disappeared. The kneading/mixing time was 55 minutes, indicating that a practically acceptable predope amount affording 760 mAh/g could be achieved within a short time.

The lithium-dopable silicon-base material as predoped with lithium above (lithium-doped silicon-base material: electric storage device negative electrode material according to the invention) was coated onto a stainless steel mesh punched to a diameter of 17 mm, and dried on a hot plate at 120° C. for 10 minutes, yielding a test electrode. Two test electrodes were prepared; one was used directly in the electrochemical measurement to be described below, and the other was used to measure the content of solvent therein. The content of solvent in the electrode was determined by drying the electrode on a hot plate at 120° C. while monitoring its weight, and computing the difference between the weight prior to drying and the weight at the time when the weight loss became nil. In this case, the weight loss became nil on drying over 10 minutes. It is noted that the electrodes were prepared in an argon dry box having a moisture content of up to 1 ppm.

Electrochemical measurement was carried out as follows. A two-electrode cell was constructed using the test electrode as a working electrode and lithium metal as counter electrode. The working electrode, glass mat of 180 μm, and lithium metal were stacked. A solution of $LiPF_6$ in a solvent mixture of ethylene carbonate and methyl ethyl carbonate in a weight ratio of 3:7, having a concentration of 1 mol/L was fed to the stack as the electrolytic solution, immediately after which the potential of the working electrode (electrode comprising predoped silicon-base material) versus lithium metal was measured. The potential of this Example was 129 mV versus lithium metal. The potential of the dopable silicon-base material not doped with lithium was about 3 V versus lithium metal. Since a potential of 129 mV was measured immediately after assembly, it was confirmed that the dopable silicon-base material had been doped with lithium by the predoping method. The lithium-doped silicon-base material shows a X-ray diffraction pattern in which broad peaks are observed near $2\theta=28.4°$, $47.3°$, and $56.1°$, and which is the same pattern as the dopable silicon-base material which is electrochemically predoped.

Separately, predoping was performed by the same procedure as above. The lithium-doped silicon-base material thus obtained was coated onto a stainless steel mesh punched to a diameter of 17 mm, and dried on a hot plate at a temperature of 120° C., 140° C., 160° C. or 230° C. for a time of 10 minutes, yielding test electrodes. The test electrodes had a potential versus lithium metal of 158 mV when dried at 120° C., 163 mV when dried at 140° C., 176 mV when dried at 160° C., and 197 mV when dried at 230° C. Since only a little change of potential was observed even when the drying temperature was elevated to 230° C., the lithium-doped silicon-base material was stable. Notably, JP-A 2012-38686 describes that the polycyclic aromatic hydrocarbon shows a potential versus lithium metal of 240 mV when dried at 140° C., 290 mV when dried at 160° C., and 380 mV when dried at 170° C., a substantial increase of potential is observed at a temperature in excess of 160° C., and thus drying at or below 160° C. is preferable.

Next, except that the atmosphere where predoping was performed or the test electrodes were prepared was changed from the argon dry box having a moisture content of up to 1 ppm to a dry chamber (dry air atmosphere) having a moisture content of 40 ppm, a lithium-doped silicon-base material was prepared by predoping in the same procedure as above, and test electrodes were prepared by coating the lithium-doped silicon-base material onto a stainless steel mesh punched to a diameter of 17 mm, and drying on a hot plate at 120° C. for a time of 1, 4 or 20 minutes. The electrodes had a solvent content of 95% when dried for 1 minute, 52% when dried for 4 minutes, and 0% when dried for 10 minutes, based on the weight of lithium-doped silicon-base material. The potential versus lithium metal of the test electrodes was measured by the same method as above. The electrodes had a potential of 116 mV when dried for 1 minute, 105 mV when dried for 4 minutes, and 103 mV when dried for 10 minutes. The lithium-doped silicon-base material, even when processed in a dry chamber (dry air atmosphere) having a moisture content of 40 ppm, shows that predoping can be performed by the predoping method of the invention, and the potential versus lithium metal experiences no changes on drying of the electrode to a solvent content of 0%. Also, test electrodes separately prepared via drying at 120° C. for 20 minutes were exposed for 8 hours in a dry chamber (dry air atmosphere) having a moisture content of 40 ppm, whereupon the potential versus lithium metal remained unchanged. The lithium-doped silicon-base material can be stored in a dry chamber (dry air atmosphere) having a moisture content of 40 ppm even after the electrode is dried to a solvent content of 0%.

As is evident from the above results, the lithium-dopable silicon-base material which is predoped with lithium by the inventive method is stable over a wide range of drying temperature necessary for electrode formation and a wide range of atmosphere moisture content. Once the material is dried at or above 200° C., electrodes using polyimide or polyamide-imide resin having improved cycle performance can be heated. The advantage of thermal stability of the lithium-doped silicon-base material was confirmed for those electrodes which were prepared from the lithium-doped silicon-base material and polyimide resin, predoped with lithium to 620 mAh/g, and heated at 230° C. for 60 minutes. Using lithium metal as the counter electrode and a solution of $LiPF_6$ in a solvent mixture of ethylene carbonate and methyl ethyl carbonate in a weight ratio of 3:7, having a concentration of 1 mol/L as the electrolytic solution, doping/dedoping of lithium was electrochemically performed. There were marked a lithium doping amount of 1814 mAh/g and a lithium dedoping amount of 1732 mAh/g, and an efficiency of 95.5%, indicating that the efficiency improving effect of predoping is exerted even after heating at 230° C. for 60 minutes. As compared with an efficiency of 85.5% in the case of 120° C. heating, a more efficiency improving effect of predoping is exerted on the polyimide resin-based electrode by 230° C./60 minute heating.

Examples 2 to 5

In an argon dry box having a moisture content of up to 1 ppm, 0.25 g of the lithium-dopable silicon-base material obtained in Example 1 and a solvent as shown in Table 1 were added and mixed in a mortar. To the clay-like mixture thus obtained, pieces of about 10 mm squares cut from lithium metal foil of 0.03 mm thick were added in divided portions of each about 0.008 g for incorporation while kneading/mixing was continued. By following the procedure of adding lithium metal after complete disappearance of previous lithium metal, lithium metal was kneaded and mixed in a total amount of 0.05 g (corresponding to 760 mAh/g relative to the weight of lithium-dopable silicon-base material). At the end of kneading/mixing, the lithium metal foil added had completely disappeared. The kneading/mixing time was 50 to 60 minutes except Example 2. In Example 2 using methyl ethyl carbonate (b.p. 107° C.), the kneading/mixing time was 70 minutes because the operation of supplementing the solvent was necessary as a result of the solvent evaporating off.

The dopable silicon-base material as predoped with lithium above (lithium-doped silicon-base material: electric storage device negative electrode material according to the invention) was coated onto a stainless steel mesh punched to a diameter of 17 mm, and dried on a hot plate at 120° C. for 10 minutes, yielding a test electrode. Two test electrodes were prepared; one was used directly in the electrochemical measurement to be described below, and the other was used to measure the content of solvent therein. The content of solvent in the electrode was determined by drying the electrode on a hot plate at 120° C. while monitoring its weight, and computing the difference between the weight prior to drying and the weight at the time when the weight loss became nil. For any solvents, the weight loss became nil on drying over 10 minutes. The potential versus lithium metal of the test electrodes thus obtained was measured by the method described in Example 1. The results are shown in Table 1 together with the results of Example 1. The dopable silicon-base material had a potential versus lithium metal of about 3 V, which declined on use of any solvents, proving that the dopable silicon-base material had been doped with lithium by the predoping method.

TABLE 1

| | Solvent | b.p. | Amount of solvent used in mixing | Potential versus lithium metal |
|---|---|---|---|---|
| Example 1 | propylene carbonate | 242° C. | 0.31 g | 129 mV |
| Example 2 | ethylene carbonate*:methyl ethyl carbonate (weight ratio 50:50) | 238° C.* | 1.33 g | 240 mV |
| Example 3 | γ-butyrolactone*:propylene carbonate (weight ratio 84:16) | 204° C.* | 0.34 g | 269 mV |
| Example 4 | γ-butyrolactone | 204° C. | 0.34 g | 400 mV |
| Example 5 | dodecane | 215° C. | 0.29 g | 212 mV |

Example 6

In a dry chamber (dry air atmosphere) having a moisture content of 40 ppm, 10 g of the dopable silicon-base material and 6.53 g of propylene carbonate (b.p. 242° C.) having a water content of up to 30 ppm were added to a planetary centrifugal or rotation/revolution mixer (Thinky-Mixer AR-250, container 100 mL, by Thinky Co., Ltd.) where they were kneaded and mixed. To the high-viscosity (non-flowing) mixture thus obtained, pieces of about 10 mm squares cut from lithium metal foil of 0.03 mm thick were added in divided portions of about 0.007 g to 0.15 g (smaller amounts during initial kneading). Using the planetary centrifugal mixer, the procedure of kneading/mixing at a rotation speed of 2000 rpm and a revolution speed of 2200 rpm for 30 seconds to 3 minutes and cooling was repeated 18 times while the disappearance of lithium metal was confirmed. In the course, propylene carbonate was added in properly divided amounts of 0.26 g (on addition of lithium metal corresponding to 295 mAh/g), 0.34 g (on addition of lithium metal corresponding to 470 mAh/g), 0.22 g (on addition of lithium metal corresponding to 640 mAh/g), and 0.26 g (on addition of lithium metal corresponding to 760 mAh/g) for viscosity adjustment. A predetermined amount (corresponding to 760 mAh/g relative to the weight of dopable silicon-base material) of lithium metal was kneaded and mixed.

The lithium-dopable silicon-base material as predoped with lithium above (lithium-doped silicon-base material: electric storage device negative electrode material according to the invention) was coated onto a stainless steel mesh punched to a diameter of 17 mm, and dried on a hot plate at 120° C. for 10 minutes, yielding a test electrode. The potential versus lithium metal of the test electrode thus obtained was 51 mV as measured by the method described in Example 1. It was confirmed that the lithium-dopable silicon-base material had been doped with lithium by the predoping method using a planetary centrifugal mixer.

Example 7

In a dry chamber (dry air atmosphere) having a moisture content of 40 ppm, 16 g of the dopable silicon-base material and 18 g of propylene carbonate (b.p. 242° C.) having a water content of up to 30 ppm were added to a planetary centrifugal mixer (Thinky-Mixer AR-250, container 100 mL, by Thinky Co., Ltd.) where they were kneaded and mixed. To the high-viscosity (non-flowing) mixture thus obtained, pieces of about 2 mm squares cut from lithium metal foil of 0.12 mm thick were added in divided portions of about 0.7 g. Using the planetary centrifugal mixer, the procedure of kneading/mixing at a rotation speed of 2000 rpm and a revolution speed of 2200 rpm for 3 to 5 minutes was repeated 3 times while the disappearance of the majority of lithium metal was confirmed. In this way, a predetermined amount (corresponding to 500 mAh/g relative to the weight of dopable silicon-base material) of lithium metal was kneaded and mixed. In the pre-kneaded mixture, a certain amount of lithium metal was left at a visually perceivable level. Propylene carbonate was added to the pre-kneaded mixture so that the mixture became flowing (up to 10 Pa·s). This was fed to a thin-film spin high-speed kneader (Filmix FM40-40 by Primix Corp.). The procedure of kneading and mixing at a circumferential speed of 30 m/s for 300 seconds while cooling the kneading/mixing chamber at 15° C. was repeated 5 times. At the end of the procedure, lithium metal disappeared. The lithium-dopable silicon-base material as predoped with lithium above (lithium-doped silicon-base material: electric storage device negative electrode material according to the invention) was coated onto a stainless steel mesh punched to a diameter of 17 mm, and dried on a hot plate at 120° C. for 10 minutes, yielding a test electrode. The potential versus lithium metal of the test electrode thus obtained was 376 mV as measured by the method described in Example 1. It was confirmed that the lithium-dopable silicon-base material had been doped with lithium by the predoping method using a thin-film spin high-speed kneader.

As compared with the planetary centrifugal mixer, the operation of the thin-film spin high-speed kneader after pre-kneading is effective for reducing the number of additions of lithium metal and shortening the time. The temperature rises to about 50° C. during kneading/mixing, but lowers below 30° C. within 1 minutes, indicating a possibility of efficient cooling. Since the thin-film spin high-speed kneader is a kneader/mixer capable of continuous operation, it is suited in implementing the predoping method of the invention.

In this Example, pieces of about 2 mm squares cut from lithium metal foil of 0.12 mm thick were used. Pieces of lithium metal foil of 0.03 mm thick used in Example 6 were so bulky that the amount of foil added at a time was limited. When a more amount of foil was forcedly added, lithium metal foil pieces became a mass during pre-kneading, and lithium metal fragments were left even after kneading/mixing on a thin-film spin high-speed kneader. When pieces of about 2 mm squares cut from lithium metal foil of at least 0.4 mm thick were used, pieces clogged in between blades of a thin-film spin high-speed kneader.

Example 8

In an argon dry box having a moisture content of up to 1 ppm, 0.75 g of the lithium-dopable silicon-base material described in Example 1, 0.1 g of vapor grown carbon fibers (VGCF by Showa Denko K.K.) as conductive agent, and 0.74 g of a solvent mixture of ethylene carbonate and ethyl methyl carbonate (weight ratio 50:50) having a water content of up to 30 ppm were added and mixed in a mortar. To the clay-like mixture thus obtained, pieces of about 10 mm squares cut from lithium metal foil of 0.03 mm thick were added in divided portions of each about 0.024 g for incorporation while kneading/mixing was continued (the solvent mixture was added at intervals). By following the procedure of adding lithium metal after complete disappearance of previous lithium metal, lithium metal was kneaded and mixed in a total amount of 0.15 g (corresponding to 760 mAh/g relative to the weight of lithium-dopable silicon-base material). At the end of kneading/mixing, the lithium metal foil added had completely disappeared. To 1.1 g of the kneaded mixture (containing about 0.25 g of lithium-doped silicon-base material) were added 0.05 g of polyvinylidene fluoride (PVDF, HSV900 by Arkema) as binder and 0.37 g of a solvent mixture of ethylene carbonate and ethyl methyl carbonate (weight ratio 50:50), followed by mixing. The mixture was coated onto a cupper foil, dried at 120° C. for 20 minutes, and pressed to form an electrode having a thickness of 29 μm and a density of 0.72 g/cm$^3$ (excluding copper foil) (electric storage device electrode according to the invention).

Figure 2:
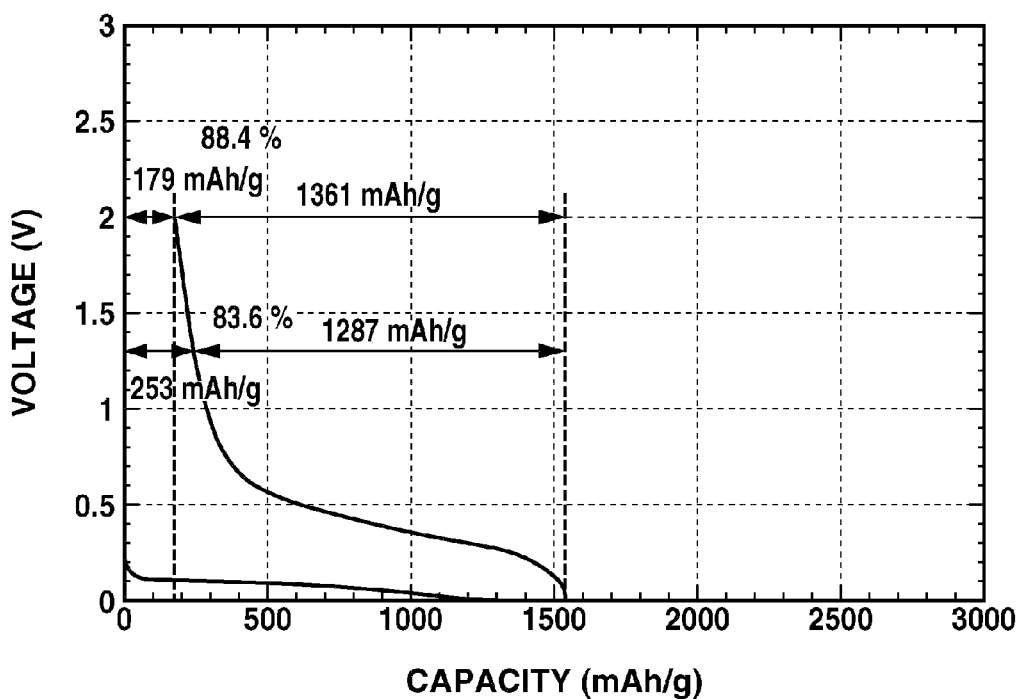
FIG. 2 illustrates Example 8 and is a diagram showing a voltage profile followed by an electrode of silicon-base material (predoped by the inventive method) upon doping and dedoping of lithium.

Using the electrode punched to a diameter of 17 mm, lithium metal as the counter electrode, and a solution of $LiPF_6$ in a solvent mixture of ethylene carbonate and methyl ethyl carbonate in a weight ratio of 3:7, having a concentration of 1 mol/L as the electrolytic solution, doping/dedoping of lithium was electrochemically performed. Specifically, lithium was doped or absorbed by the constant current (400 mA/g relative to the weight of lithium-dopable silicon-base material)-constant voltage (voltage 1 mV vs. $Li/Li^+$) method (time: 8 hours), and thereafter, lithium was dedoped or desorbed at a constant current (400 mA/g relative to the weight of lithium-dopable silicon-base material) until a voltage (2.0 V vs. $Li/Li^+$) was reached. There were marked a lithium doping amount of 1539 mAh/g and a lithium dedoping amount of 1361 mAh/g relative to the lithium-dopable silicon-base material, and an efficiency of 88.4%. This is an efficiency improvement of about 10% over the efficiency of undoped lithium-dopable silicon-base material which is 77.8% as described in Example 1. FIG. 2 shows a voltage profile upon doping (absorbing) and dedoping (desorbing).

Example 9

In an argon dry box having a moisture content of up to 1 ppm, 0.75 g of the lithium-dopable silicon-base material described in Example 1, 0.1 g of vapor grown carbon fibers (VGCF by Showa Denko K.K.) as conductive agent, and 0.74 g of a solvent mixture of ethylene carbonate and γ-butyrolactone (weight ratio 20:80) having a water content of up to 30 ppm were added and mixed in a mortar. To the clay-like mixture thus obtained, pieces of about 10 mm squares cut from lithium metal foil of 0.03 mm thick were added in divided portions of each about 0.024 g for incorporation while kneading/mixing was continued. By following the procedure of adding lithium metal after complete disappearance of previous lithium metal, lithium metal was kneaded and mixed in a total amount of 0.15 g (corresponding to 760 mAh/g relative to the weight of lithium-dopable silicon-base material). At the end of kneading/mixing, the lithium metal foil added had completely disappeared. To 0.6 g of the kneaded mixture (containing about 0.17 g of lithium-doped silicon-base material) were added 0.0335 g of polyimide resin (soluble in γ-butyrolactone) as binder and 0.235 g of a solvent mixture of ethylene carbonate and γ-butyrolactone (weight ratio 20:80), followed by mixing and deaeration. Thereafter, the mixture was coated onto a supper foil, dried at 120° C. for 10 minutes, and pressed to form an electrode having a thickness of 32 μm and a density of 0.55 g/cm$^3$ (excluding copper foil) (electric storage device electrode according to the invention).

Figure 3:
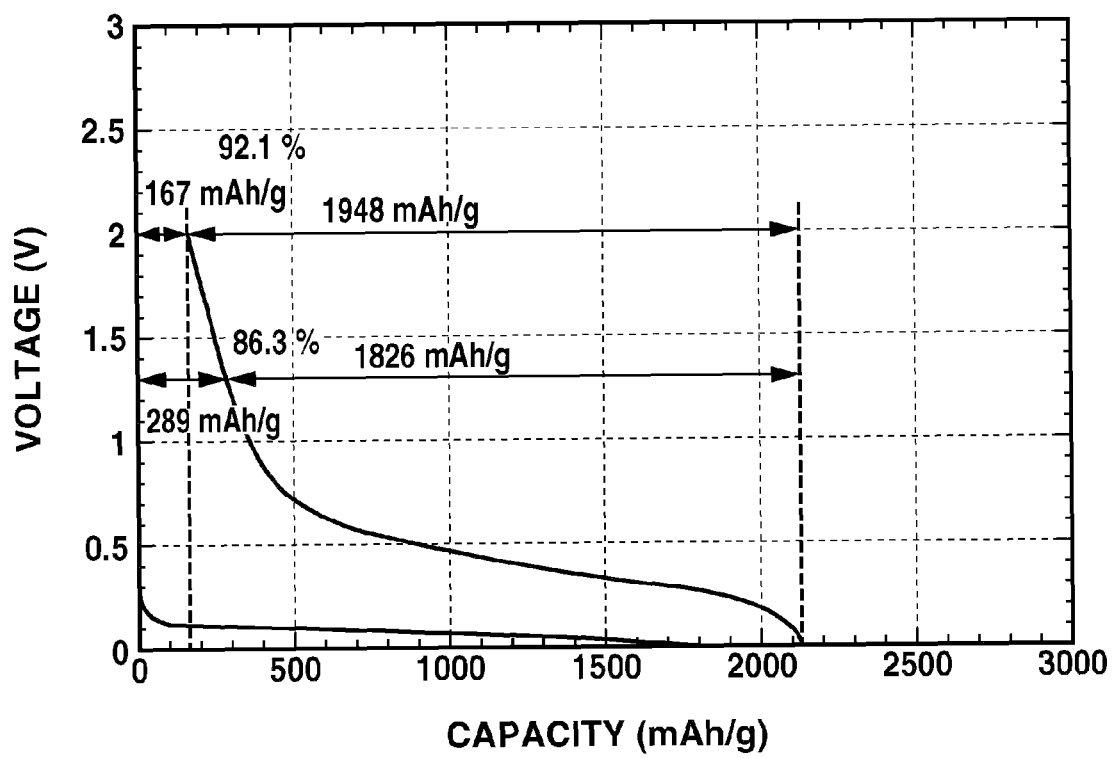
FIG. 3 illustrates Example 9 and is a diagram showing a voltage profile followed by an electrode of silicon-base material (predoped by the inventive method) upon doping and dedoping of lithium.

Using the electrode punched to a diameter of 17 mm, lithium metal as the counter electrode, and a solution of $LiPF_6$ in a solvent mixture of ethylene carbonate and methyl ethyl carbonate in a weight ratio of 3:7, having a concentration of 1 mol/L as the electrolytic solution, doping/dedoping of lithium was electrochemically performed. Specifically, lithium was doped or absorbed by the constant current (400 mA/g relative to the weight of lithium-dopable silicon-base material)-constant voltage (voltage 1 mV vs. $Li/Li^+$) method (time: 8 hours), and thereafter, lithium was dedoped or desorbed at a constant current (400 mA/g relative to the weight of lithium-dopable silicon-base material) until a voltage (2.0 V vs. $Li/Li^+$) was reached. There were marked a lithium doping amount of 2115 mAh/g and a lithium dedoping amount of 1948 mAh/g relative to the lithium-dopable silicon-base material, and an efficiency of 92.1%. This is an efficiency improvement of about 15% over the efficiency of undoped lithium-dopable silicon-base material which is 77.8% as described in Example 1. FIG. 3 shows a voltage profile upon doping (absorbing) and dedoping (desorbing).

Example 10

By the same procedure as in Example 8 except that the mixture was deaerated prior to coating onto a copper foil, an electrode having a thickness of 34 μm and a density of 0.99 g/cm$^3$ (excluding copper foil) (electric storage device electrode according to the invention) was obtained. A lithium ion cell (electric storage device according to the invention) was constructed by combining the resulting negative electrode (size: 15 mm×21 mm) with a positive electrode (size: 14 mm×20 mm) composed of $LiCoO_2$, acetylene black and PVDF in a weight ratio of 89.25:5.25:5.5 and having a thickness of 83 μm and a density of 3.0 g/cm$^3$, and using a solution of $LiPF_6$ in a solvent mixture of ethylene carbonate and methyl ethyl carbonate in a weight ratio of 3:7, having a concentration of 1 mol/L as the electrolytic solution, and a microporous polyethylene membrane of 22 μm thick as the separator.

The cell was charged by the constant current (2 mA)-constant voltage (voltage 4.2 V) method (time: 8 hours), after which it was discharged at a constant current flow (2 mA) until the voltage reached 3.0 V. There were marked an initial charge capacity of 8.30 mA and an initial efficiency of 85.9%. Provided that the cell had a thickness of 100 prior to charging, the cell had a thickness of 130 at the end of charging and 100 at the end of discharging.

Comparative Example 1

A lithium ion cell was constructed by using the (non-predoped) electrode having a thickness of 18 μm and a density of 1.17 g/cm$^3$ (excluding copper foil) prepared in Preparation Example 1 (Example 1) as the negative electrode (size: 15 mm×21 mm), combining it with a positive electrode (size: 14 mm×20 mm) composed of $LiCoO_2$, acetylene black and PVDF in a weight ratio of 89.25:5.25:5.5 and having a thickness of 83 μm and a density of 3.0 g/cm³, and using a solution of LiPF$_6$ in a solvent mixture of ethylene carbonate and methyl ethyl carbonate in a weight ratio of 3:7, having a concentration of 1 mol/L as the electrolytic solution, and a microporous polyethylene membrane of 22 μm thick as the separator.

The cell was charged by the constant current (2 mA)-constant voltage (voltage 4.2 V) method (time: 8 hours), after which it was discharged at a constant current flow (2 mA) until the voltage reached 3.0 V. There were marked an initial charge capacity of 6.51 mA and an initial efficiency of 64.1%. Provided that the cell had a thickness of 100 prior to charging, the cell had a thickness of 195 at the end of charging and 142 at the end of discharging.

The electric storage device of Example 10 within the scope of the invention which uses an electrode (electric storage device electrode according to the invention) comprising a lithium-predoped silicon-base material (electric storage device negative electrode material according to the invention) as the negative electrode marks an efficiency improvement of more than 20% and a capacity improvement of 27% over Comparative Example 1 (using non-predoped negative electrode) although they use the same positive electrode. From a comparison of cell thickness change between Example 10 and Comparative Example 1, it is evident that the volume change (expansion and shrinkage) of the electrode by doping/dedoping of lithium, which causes a decline of capacity during cyclic operation, is suppressed.

INDUSTRIAL APPLICABILITY

In contrast to the prior art predoping methods, the invention proposes a brief, uniform predoping method comprising the simple step of kneading and mixing a silicon-base material and lithium metal in the presence of a specific solvent. The invention solves the problems of initial efficiency and cycle performance of silicon-base material which is one of key materials in the trend toward the increased energy density of electric storage devices such as lithium ion batteries, and is a technique useful for developing high-energy-density electric storage devices of the next generation using silicon-base materials.

The invention claimed is:

1. A lithium predoping method comprising kneading and mixing lithium metal with a silicon-base material capable of absorbing and desorbing lithium ions in the presence of a solvent, wherein
    said silicon-base material comprising at least one material selected from the group consisting of (a) silicon and a composite dispersion of silicon and silicon dioxide, (b) silicon oxide particles represented by a formula SiOx, wherein 0.5≤x<1.6, having a microstructure wherein silicon nanoparticles are dispersed in a silicon-base compound, and (c) a silicon oxide of the above formula.

2. The lithium predoping method of claim 1 wherein a surface of the silicon-base material is coated with a carbon coating which is 1 to 40% by weight of the silicon-base material.

3. The lithium predoping method of claim 1 wherein the solvent is selected from the group consisting of carbonates, lactones, sulfolanes, ethers, and hydrocarbons, alone or in admixture of two or more, and is inert to lithium metal and lithium-doped silicon-base material.

4. The lithium predoping method of claim 1 wherein the solvent is inert to lithium metal and lithium-doped silicon-base material and has a boiling point of at least 150° C.

5. The lithium predoping method of claim 1 wherein the silicon-base material and lithium metal are kneaded and mixed in the presence of a solvent using a thin-film spin high-speed kneader.

6. The lithium predoping method of claim 1 wherein the silicon-base material and lithium metal having a thickness of at least 0.1 mm are pre-kneaded in the presence of a solvent, and thereafter, kneaded and mixed using a thin-film spin high-speed kneader.

7. A negative electrode material for electric storage devices which is predoped with lithium by a method comprising kneading and mixing lithium metal with a silicon-base material in the presence of a solvent, wherein
    the silicon-base material comprises at least one silicon-base material capable of absorbing and desorbing lithium ions selected from the group consisting of (a) silicon and a composite dispersion of silicon and silicon dioxide, (b) silicon oxide particles represented by a formula SiOx, wherein 0.5≤x<1.6, having a microstructure wherein silicon nanoparticles are dispersed in a silicon-base compound, and (c) a silicon oxide of the above formula, and
    a carbon-coated silicon-base material obtained by coating a surface of the silicon-base material with a carbon coating which is 1 to 40% by weight of the silicon-base material.

8. An electrode for electric storage devices, comprising the negative electrode material of claim 7 and a binder.

9. The electrode of claim 8 wherein the binder is a polyimide resin or polyamide-imide resin.

10. The electrode of claim 8 wherein the electrode has been heated at a temperature of at least 200° C.

11. An electric storage device comprising the electrode of claim 8.

12. The electrode of claim 7, further comprising conductive fibers as conductive agent.

13. An electrode of claim 12 wherein the fibrous conductive fibers are vapor grown carbon fibers.

* * * * *